United States Patent
Ibsen et al.

(10) Patent No.: US 8,851,109 B2
(45) Date of Patent: Oct. 7, 2014

(54) DETACHABLE HANDLE FOR ADJUSTING A VALVE AND AN ASSEMBLY COMPRISING A DETACHABLE HANDLE AND A VALVE

(71) Applicant: FlowCon International ApS, Slagelse (DK)

(72) Inventors: Bjarne Wittendorff Ibsen, Dubai (AE); Mille Sveje Bøjgaard, København Ø (DK); Gitte Pedersen, Odense NV (DK)

(73) Assignee: FlowCon International ApS, Slageise (DK)

( * ) Notice: Subject to any disclaimer, the term of this patent is extended or adjusted under 35 U.S.C. 154(b) by 0 days.

(21) Appl. No.: 14/018,822

(22) Filed: Sep. 5, 2013

(65) Prior Publication Data
US 2014/0076418 A1 Mar. 20, 2014

(30) Foreign Application Priority Data
Sep. 17, 2012 (DK) .................................. 2012 00571

(51) Int. Cl.
*F16K 37/00* (2006.01)
*F16K 31/60* (2006.01)

(52) U.S. Cl.
CPC ............... *F16K 31/607* (2013.01); *F16K 31/60* (2013.01); *F16K 37/0058* (2013.01); *F16K 37/0016* (2013.01)
USPC ..................................... 137/556; 137/315.18

(58) Field of Classification Search
CPC ...................................................... F16K 31/60
USPC .......... 137/315.18, 553, 556, 505.14; 251/14, 251/129.03
See application file for complete search history.

(56) References Cited

U.S. PATENT DOCUMENTS

| 3,441,115 A | | 4/1969 | Gunther | |
|---|---|---|---|---|
| 3,687,415 A | * | 8/1972 | Turkot | 251/89 |
| 4,637,423 A | * | 1/1987 | Gray | 137/382.5 |
| 5,004,011 A | * | 4/1991 | Linder et al. | 137/556 |
| 5,769,118 A | * | 6/1998 | Lenberg | 137/553 |

(Continued)

FOREIGN PATENT DOCUMENTS

| CN | 223 0386 Y | 7/1996 |
|---|---|---|
| EP | 2 108 870 | 10/2009 |

(Continued)

OTHER PUBLICATIONS

First Office Action issued Mar. 27, 2013 for PA 2012 00571.

(Continued)

*Primary Examiner* — John K Fristoe, Jr.
*Assistant Examiner* — Reinaldo Sanchez-Medina
(74) *Attorney, Agent, or Firm* — Brinks Gilson & Lione

(57) ABSTRACT

A detachable handle for adjusting a valve by rotation of a rotatable adjustment element. The handle is provided with a body including a front side having an angular scale, an opposite rear side and a circumferential gripping face. The handle is also provided with a coupling element configured to detachably and operably connect to the rotatable adjustment element. At least a portion of the body along an edge of the angular scale is transparent or open so that an operator can see through the portion of the body. An assembly of a valve and the detachable handle is also provided. The valve is provided with a rotatable adjustment element for adjusting the valve. The valve has a face from which the rotatable adjustment element protrudes. This face is provided with a fixed marker.

13 Claims, 6 Drawing Sheets

(56) References Cited

U.S. PATENT DOCUMENTS

| | | | |
|---|---|---|---|
| 6,938,642 B2* | 9/2005 | Massengale et al. | 137/553 |
| 7,264,018 B2* | 9/2007 | Massengale et al. | 137/553 |
| 7,546,846 B2* | 6/2009 | Massengale et al. | 137/12 |
| 7,699,072 B2* | 4/2010 | Benvenuto | 137/510 |
| 7,766,028 B2* | 8/2010 | Massengale et al. | 137/15.19 |
| 8,141,582 B2* | 3/2012 | Fukano et al. | 137/556 |
| 2002/0104569 A1* | 8/2002 | Massengale et al. | 137/553 |
| 2011/0146818 A1 | 6/2011 | Dolenti et al. | |

FOREIGN PATENT DOCUMENTS

| | | |
|---|---|---|
| GB | 355878 | 9/1931 |
| IT | MI 940126 U1 | 2/1994 |
| SE | 448651 B | 3/1987 |

OTHER PUBLICATIONS

Second Office Action issued Apr. 19, 2013 for PA 2012 00571.

* cited by examiner

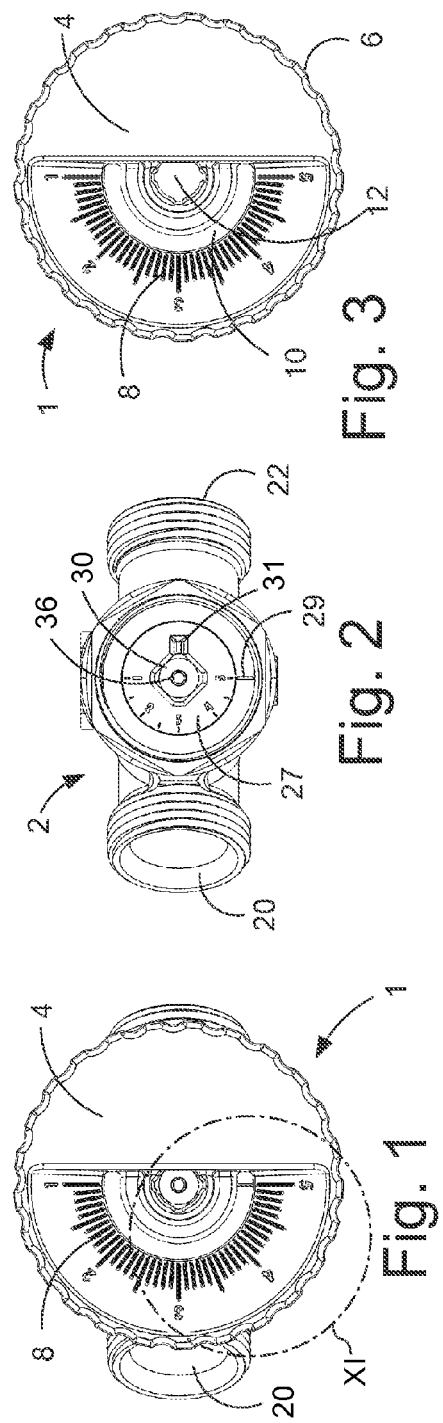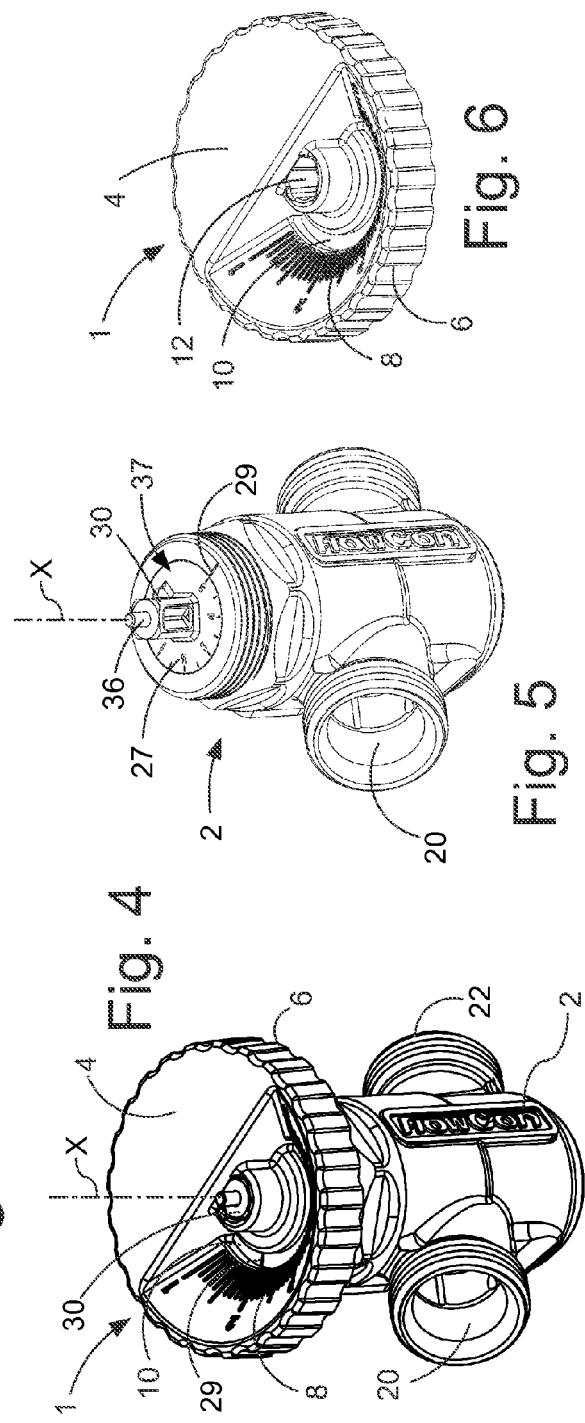

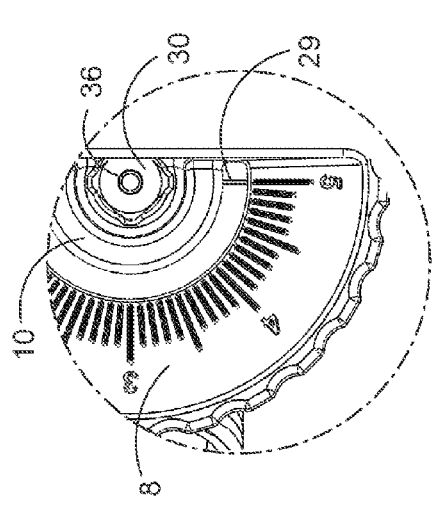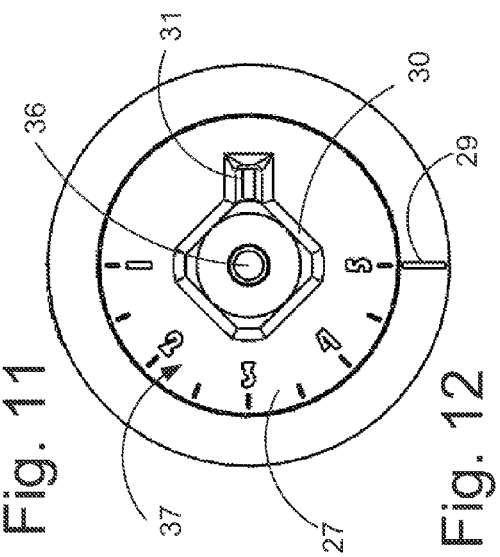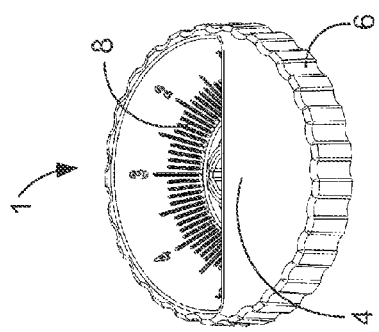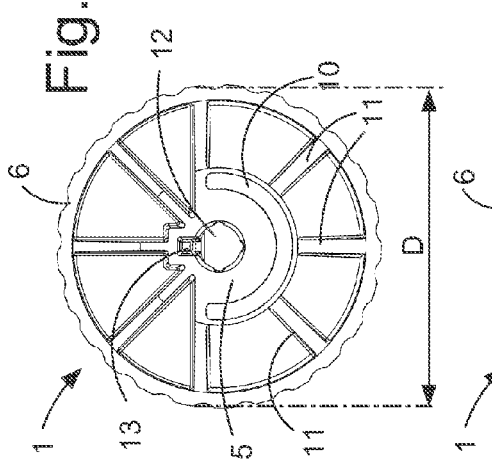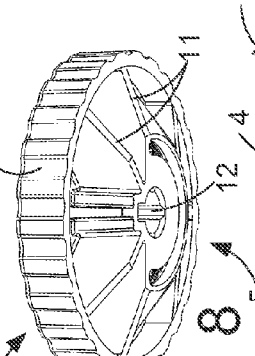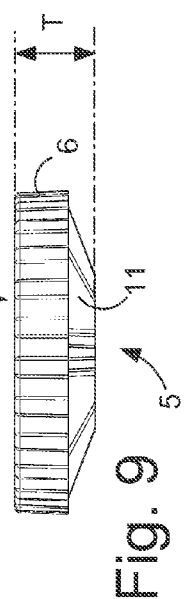

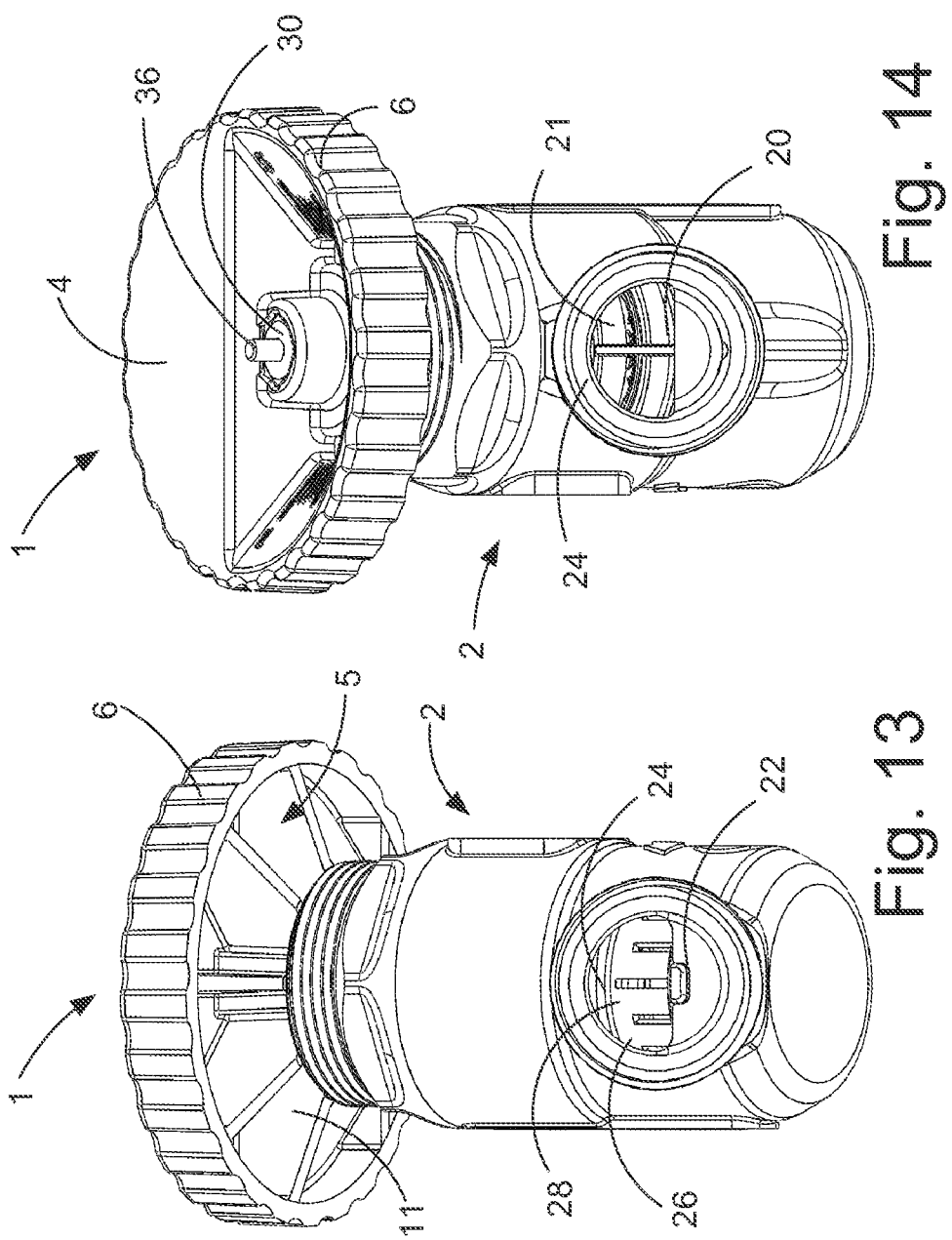

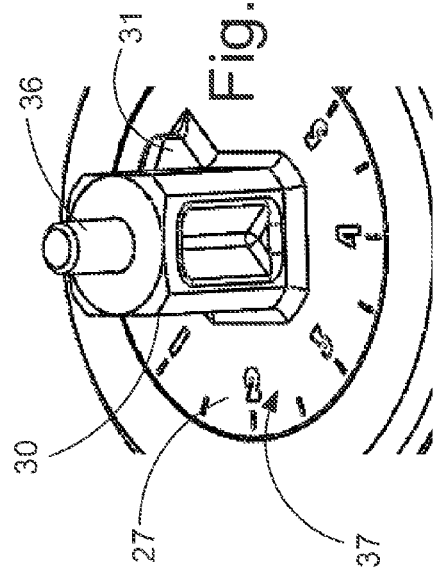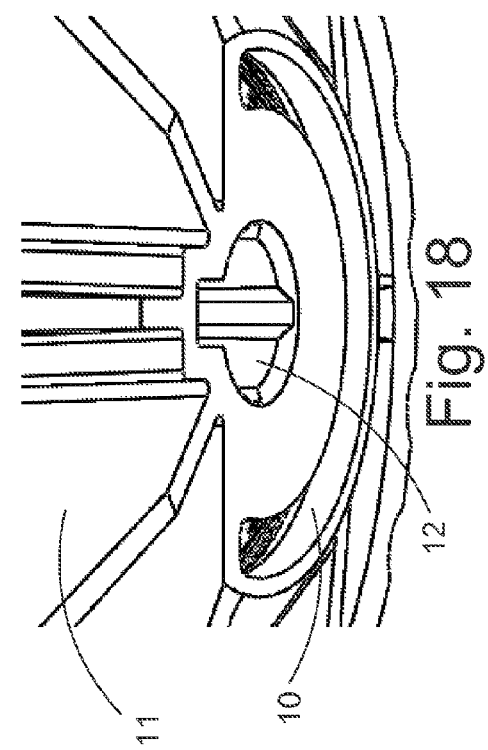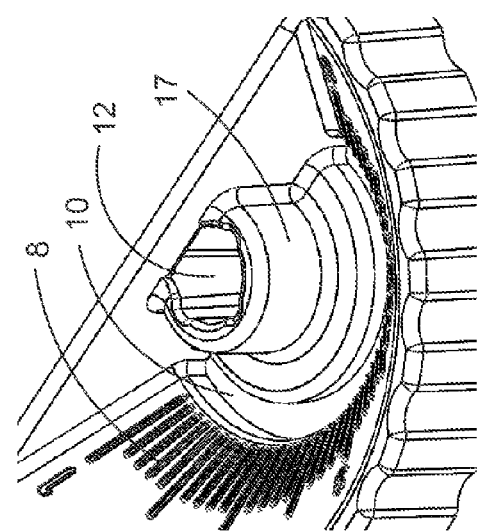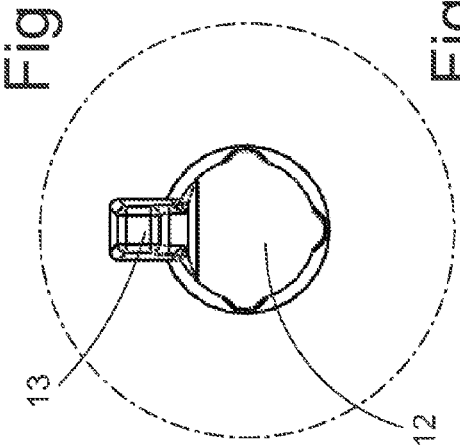

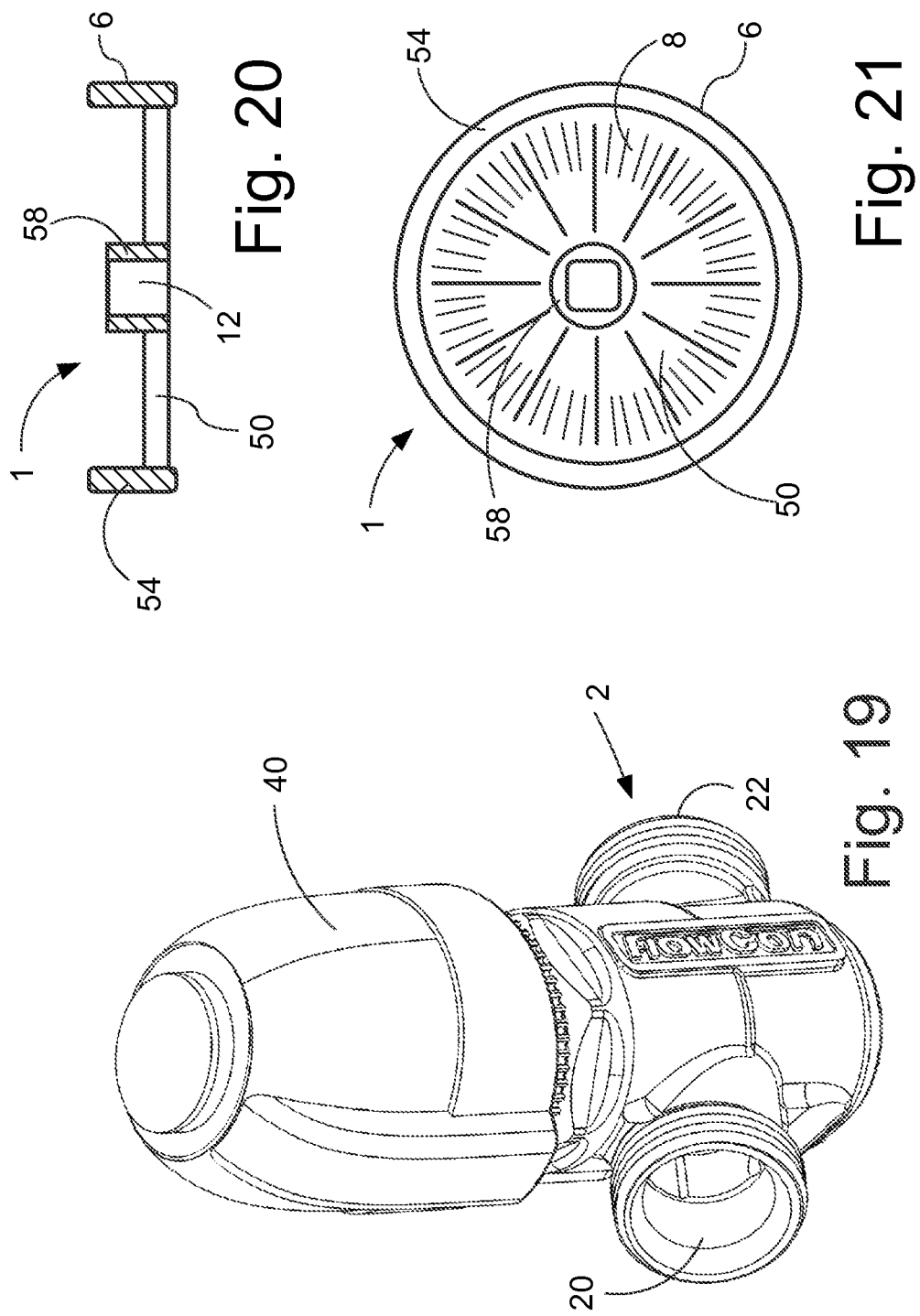

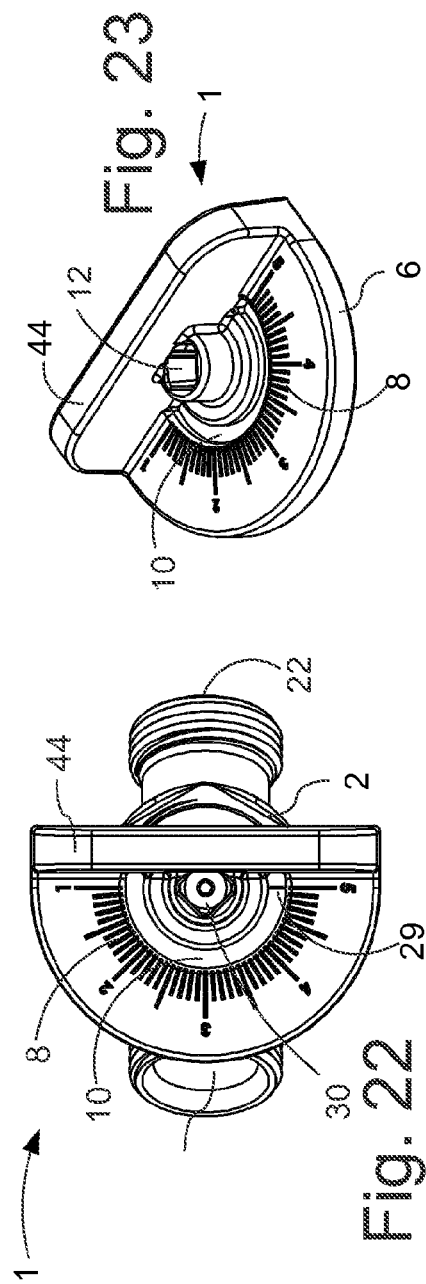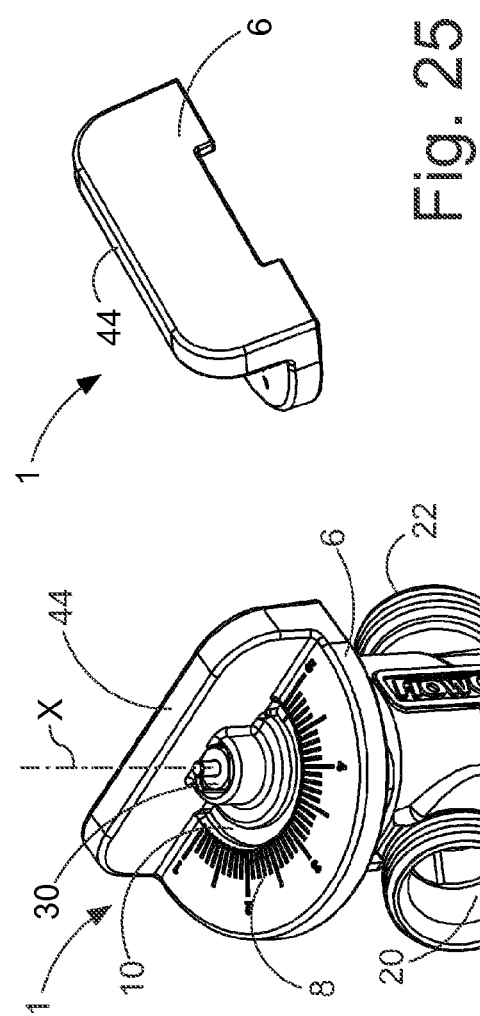

DETACHABLE HANDLE FOR ADJUSTING A VALVE AND AN ASSEMBLY COMPRISING A DETACHABLE HANDLE AND A VALVE

RELATED APPLICATIONS

This application claims the benefit of priority under 35 U.S.C. §119 to Danish patent application No. PA 2012 00571, filed Sep. 17, 2012.

FIELD

The present application relates to a detachable handle for adjusting a valve and to an assembly comprising a detachable handle and a valve. More particularly the application relates to a handle for adjusting a valve by rotation of a rotatable adjustment element of the valve about a rotation axis and to an assembly comprising a valve, and a detachable handle, the valve being provided with a rotatable adjustment element that is rotatable about a rotation axis for adjusting the valve.

BACKGROUND

A known valve that has a rotatable adjustment element is the FlowCon® SME regulator valve. The SME valve is a self-balancing dynamic flow control valve that is differential pressure independent, with an actuator that is controlled by an input signal. The amount of liquid flowing though the valve is determined by the flow area of a throttling element in the valve. The valve has a housing from which a rotatable adjustment member protrudes. The angular position of the rotatable adjustment member determines the maximum flow area of the throttling element. The actual position of the rotatable adjustment member has to be set accurately so the operator will know the exact maximum flow for the chosen setting and in particular to avoid that the setting is below the actually required setting.

The position of an axially displaceable shaft that is concentric with the rotatable adjustment member and that further is protruding from the latter, determines the actual flow area of the throttling element between a minimum value and the maximum flow area. The axially displaceable shaft is operably connected to the actuator so that the position of the axially displaceable shaft can be determined with a control signal to the actuator.

The maximum flow area is manually set by an operator when the actuator is dismounted from the valve and the rotatable adjustment member can be accessed. The shape and size of the rotatable adjustment member and the torque required to rotate it is such that it is not possible for the operator to adjust it without the use of a tool. For this purpose a special key is provided. The special key can detachably couple to the rotatable adjustment member and provides the operator with enough leverage to adjust the position of the rotatable adjustment member. The surface of the valve around the rotatable adjustment member is provided with a rough angular scale and the rotatable adjustment member is provided with a small indicator arrow for indicating the portion of the rotatable adjustment member relative to the angular scale. Inside the valve a geared mechanism connects the rotatable adjustment member to a counting wheel that is visible next to the angular scale and provides the operator with fine angular position information. After adjusting the rotatable adjustment member to a desired setting the key is detached and the actuator is mounted on the valve and the rotatable adjustment member is no longer accessible.

This known valve and key assembly has proven to function well, but requires a relatively complicated mechanism for indicating the fine angular position of the rotatable adjustment member. This mechanism comprises a relatively large number of parts that is complicated to handle and assemble in the production process. Further, there will always be a certain amount of play due to tolerances in the individual components of the gear mechanism, and these are added up in a gear mechanism with several components in series, which can lead to hysteresis and inaccuracy. In the known valve this aspect is solved by an operator always staring a setting from the minimum setting and increasing from the minimum setting to the desired setting.

BRIEF SUMMARY

In one aspect, a device for adjusting the position of a rotatable adjustment member of a valve that overcomes or at least reduces the drawbacks of the prior art is provided.

This aspect is achieved by providing a detachable handle for adjusting a valve by rotation of a rotatable adjustment element of the valve about a rotation axis, the handle comprises a body, the handle being provided with a coupling element that is configured to detachably and operably connect to the rotatable adjustment element of the valve, the body has a front side and opposite rear side and a circumferential gripping face, the front side is provided with an angular scale, at least a portion of the body along an edge of the angular scale is transparent or open so that an operator can see through the portion of the body.

By providing a handle with a fine angular scale and a body that has a see through portion so that an operator can see a reference point on a valve to which the detachable handle is to be coupled, a simple and reliable and accurate device is provided for adjusting valves of the type with a rotatable valve adjustment member.

In an embodiment the radial scale is paced around one or more curved or arc shaped slots that allow a view through the body while looking at the angular scale. Thus, the edge of the angular scale can be placed dose to the reference point and thereby accuracy can be improved.

In an embodiment the body is sized and shaped for being grasped by a hand of an operator. Thus, it is comfortable and easy for a human operator to manipulate the handle.

In an embodiment the circumferential gripping face has an average diameter in the range between 3 cm and 10 cm.

In an embodiment the coupling element comprises a dot in the body that opens to the rear side.

In an embodiment the coupling element is disposed centrally in the body.

In an embodiment the coupling element is configured such that it can only be coupled in one angular position to the rotatable adjustment element. Thus, it becomes impossible for an operator to place the detachable handle incorrectly on the rotatable valve adjustment member.

In an embodiment the detachable handle is made from a single piece of material, preferably in a mold filling process. Thus, the detachable handle can be produced for low expenses and with a simple manufacturing procedure.

In an embodiment the extent of the body between the front side and the rear side is substantially smaller than the average diameter of the circumferential gripping face. Thus, a relatively slim and handy device is provided that fits easily in a pant pocket or other suitable container.

The aspect above is also achieved by providing an assembly comprising a valve, and a detachable handle, the valve being provided with a rotatable adjustment element that is rotatable about a rotation axis for adjusting the valve, the valve is provided with a face from which a portion of the rotatable adjustment element protrudes, the face is provided with a fixed marker, the handle comprises a body, and the handle is provided with a coupling element that is configured to detachably and operably connect the detachable handle in one predetermined angular position to the rotatable adjustment element, the body has a front side and opposite rear side and a circumferential gripping face, the front side is provided with an angular scale, at least a portion of the body along an edge of the angular scale being transparent or open so that an operator can see the fixed marker through the portion of the body when the handle is coupled to the rotatable adjustment member.

By providing an assembly with a valve that is provided with a fixed marker next to the rotatable valve adjustment member, and a detachable handle that has a see though facility an operator can readily, easily and accurately adjust a rotatable valve adjustment member with a relatively simple, inexpensive and reliable tool.

In an embodiment of the assembly the valve is a regulator valve that includes differential pressure regulating facilities.

In an embodiment of the assembly the regulator valve has an adjustable orifice, the orifice being adjustable by axially displacing a shaft that is concentric with and slidably received inside the rotatable adjustment element, the assembly further comprising an actuator that can be detachably connected to the regulator valve and operably connected to the shaft when the handle is not attached to the rotatable adjustment element, and the actuator obscuring the rotatable adjustment member when said actuator is attached to said regulator valve.

In this respect, before explaining at least one embodiment of the application in detail, it is to be understood that the claims is not limited in its application to the details of construction or to the arrangements of the components set forth in the following description or illustrated in the drawings. The claims are applicable to embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which these embodiments are based may readily be utilized as a basis for the designing of other structures, methods and systems for carrying out the several purposes of the present application. It is important, therefore, that the claims be regarded as including such equivalent constructions insofar as they do not depart from the scope of the claims.

BRIEF DESCRIPTION OF THE DRAWINGS

The accompanying drawings are included to provide a further understanding of the claims and are incorporated in and constitute a part of this specification.

FIG. 1, is a top view of a valve and detachable handle assembly according to an exemplary embodiment, with a circular section marked by an interrupted line that is shown enlarged in FIG. 11, FIG. 2 is a top view of the valve of FIG. 1, FIG. 3 is a top view of the detachable handle of FIG. 1, FIG. 4 is an elevated view of the valve and detachable handle assembly of FIG. 1, FIG. 5 is an elevated view of the valve of FIG. 1, FIG. 6 is an elevated view of the detachable handle of FIG. 1, FIG. 7 is a rear view of the detachable handle of FIG. 1, FIG. 8, is an elevated view of the detachable handle of FIG. 1, FIG. 9 is a side view of the detachable handle of FIG. 1, FIG. 10 is an elevate view of the detachable handle of FIG. 1, FIG. 11 is a detailed view of a circular section of FIG. 1, FIG. 12 shows a detail of the top side of the valve of FIG. 1, FIG. 13 is an elevated view of the valve and detachable handle assembly of FIG. 1, FIG. 14 is another elevated view of the valve and detachable handle assembly of FIG. 1, FIG. 15 is a detailed perspective view of a portion the detachable handle of FIG. 1, FIG. 16 is a detailed perspective view of the top of the valve of FIG. 1, FIG. 17 is a detailed rear view of the coupling element on the rear of the handle of FIG. 1, FIG. 18 is a detailed elevated view of a portion of the rear side of the detachable handle of FIG. 1, FIG. 19 is an elevated view of the valve of FIG. 1 with an actuator mounted thereon, FIG. 20 is a sectional view of another example embodiment of a detachable handle, FIG. 21 is a top view on the detachable handle of FIG. 20, FIG. 22 is a top view on another example embodiment of a detachable handle and a valve, FIG. 23 is an elevated view of the detachable handle of FIG. 22, FIG. 24 is an elevated view of the detachable handle and a valve of FIG. 22, and FIG. 25 is another elevated view of the detachable handle and a valve of FIG. 22.

DETAILED DESCRIPTION OF PREFERRED EMBODIMENTS

Example embodiments of the invention will now be described with reference to the drawing figures, in which like reference numerals refer to like parts throughout. An embodiment in accordance with the present invention provides a detachable handle adjusting a rotatable adjustment member of a valve.

FIGS. 1 to 19 illustrate an example embodiment of a valve and detachable handle assembly. The handle 1 has a disk shaped body with a front side 4 and a rear side 5. The circumference of the disc shaped body is formed by a circumferential gripping face 6 that in this embodiment connects the front side 4 to the rear side 5. The gripping face 6 thus surrounds or encircles the detachable handle 1 and the gripping face is preferably provided with grooves or other grip improving elements. The circumferential outline of the detachable handle 1 is shown as substantially circular in the example embodiment, but it is understood that any shape that forms a dosed loop and that is suitable for grasping by the human hand, such as, half-circular, elliptical, hexagonal, octagonal, or any higher polygon or combinations thereof can be used for the circumferential outline of the handle.

Preferably, the average diameter D (cf. FIG. 7) of the circumferential outline of the body is in the range between 3 cm and 10 cm, preferably between 4.5 cm and 7.5 cm and most preferably between 5 cm and 6 cm.

The width T of the body (cf. FIG. 9) is preferably considerably smaller than the average diameter D.

In an embodiment the body of the detachable handle 1 is made from a single piece of material, preferably in a mold filling process such as by injection molding a plastic (polymeric) material.

The front side 4 of the detachable handle 1 includes a planar section that occupies slightly less than half of the front side 4. The rest of the front side 4 is formed by a curved and rearwardly sloping surface section that extends towards a curved or arched slot 10. The rearwardly sloping surface section is provided with a fine angular scale 8 and the curved slot 10 is placed such that it extends along the radially inner edge of the fine angular scale 8.

The scale 8 is marked in rough steps from 1 to 5 and the rough steps are subdivided in 10 fine steps so that the scale includes fifty angular steps. It is noted that fifty fine angular steps is merely an example and a higher or lower amount of steps or graduations can be used in accordance with circumstances, need and relation to the extent of the range of rotation.

The curved slot 10 renders a portion of the body of the handle 1 open, i.e. a portion of the body is open and allows an operator to look through the body when looking at the angular scale 8. Alternatively, at least a portion of the body of the handle 1 can be made of transparent material so that an operator can look through the attachable handle 1.

A coupling formed by a slot 12 that opens to the rear side 5 of the body of the detachable handle 1 is placed centrally in the body of the handle 1.

The rear side 5 can be provided with the ribs 11 for stabilizing the body of the handle 1.

The valve 2 is in the example embodiment a regulator valve that includes differential pressure regulating facilities. However, the teaching of this invention can also be applied to other valve types that are provided with a rotatable valve adjustment member, such as ball valves.

The valve 2 is provided with a rotatable adjustment element 30 that protrudes from a surface (face) 37 at the top of the valve 2, i.e. the portion of the rotatable adjustment element 30 that is engaged by the detachable handle 1 protrudes from the valve 2 and a portion of the rotatable adjustment element 30 extends into the valve 2 and is connected to the adjustable orifice inside the valve 2. The rotatable adjustment element 30 can be rotated about an axis X. The surface 37 at the top of the valve 2 is provided with a rough angular scale 27. The surface 37 at the top of the valve 2 is also provided with a fixed marker 29, function of which will be explained further below. The valve 2 has a valve housing that includes an net 20 and an outlet 22 for connection to a heating, cooling or air-conditioning system or the like (not shown). Although not shown, the valve housing may be provided with P/T plugs for pressure and/or temperature sensors of the like or for de-aeration equipment.

The top end of the valve housing is threaded to allow a linear actuator 40 to be attached on to the top of the valve 2, as shown in FIG. 19. The linear actuator 40 is preferably a thermal or electrical actuator.

The valve 2 is a self-balancing dynamic flow control valve that is differential pressure independent, with an actuator 40 that is controlled by an input signal. The amount of liquid flowing through the valve is determined by an adjustable throttling element, such as an adjustable orifice.

The angular position of the rotatable adjustment member 30 determines the maximum flow area of said adjustable orifice. The position of the rotatable adjustment member 30 has to be set accurately so the operator knows exactly the maximum flow for the chosen setting.

The position of an axially displaceable shaft or pin 36 that is concentric with the rotatable adjustment member 30 and protrudes from the rotatable adjustment member 30 determines the actual flow area of the throttling element in the valve between a minimum value and the maximum set value determined by the position of the rotatable adjustment number 30. The axially displaceable shaft 36 is operably connected to the linear actuator 40 so that the position of the axially displaceable shaft can be controlled with a control signal to the actuator 40.

The maximum flow area is manually set by an operator when the actuator 40 is dismounted from the valve 2 and the rotatable adjustment member 30 can be accessed. The shape and size of the rotatable adjustment member 30 and the torque required to rotate the rotatable adjustment member 30 is such that it is not possible for an operator to adjust the position of the rotatable adjustment member 30 without the use of a suitable tool. For this purpose the detachable handle 1 is provided. The detachable handle 1 is detachably coupled to the rotatable adjustment member 30 and the detachable handle 1 provides an operator with enough leverage to adjust the position of the rotatable adjustment member 30.

The surface of the valve around the rotatable adjustment member is provided with a fixed marker 29 that can be seen through the slot 10 and compared with the fine angular scale when the detachable handle 1 is mounted on the valve 2.

The rotatable valve adjustment member 30 has in an example embodiment a substantially squared cross-sectional outline, preferably with rounded off corners and retracted sides for saving on material volume, making up the rotatable adjustment number 30. The slot 12 in the detachable handle 1 has a shape that is complementary to the projecting part of the rotatable valve adjustment member 30, i.e. the slot 12 has a substantially rectangular cross sectional outline, preferably with rounded off corners. The slot 12 also opens to the front side for giving space to the displaceable shaft 36. An angular wall 17 of the detachable handle 1 surrounds the slot 12.

The projecting part of the rotatable adjustment member 30 is provided with a radially extending projection 31. The slot 12 is provided with a corresponding radially extending recess 13. The projection 31 fits into the recess 13 and the presence of the projection 31 and the recess 13 ensure that the handle 1 can only be coupled to the rotatable valve adjustment member 30 in one angular position of the handle 1 relative to the valve adjustment number 30. Thus, it is practically impossible for an operator to couple the handle to the rotatable valve adjustment member 30 in a wrong angular position. Because only two components are involved, namely the detachable handle 1 and the rotatable adjustment number 30 it is relatively easy to control the production tolerances such that there is practically no play between the detachable handle 1 and the rotatable adjustment member 30 when the detachable handle 1 is coupled to the rotatable adjustment member 30.

When the handle 1 is coupled to the rotatable valve adjustment member 30, the user can adjust the position of the rotatable valve adjustment number 30 very accurately. The fixed marker 29 is visible through the curved slot 10 and the position of the fixed marker 29 relative to the fine angular scale 8 is easy to read for the operator. Thus, an operator can with great ease adjust the rotational position of the rotatable valve adjustment number 30 by referring to the fixed marker 29 relative to the fine angular scale 8.

After adjusting the rotatable adjustment member 30 to a desired setting the handle 1 is detached and the actuator 40 is mounted on the valve 2 and the rotatable adjustment member 30 is no longer accessible.

FIGS. 20 and 21 show another example embodiment of the detachable handle 1. In this example embodiment the handle 1 comprises a disc 50 of transparent material, such as a transparent plastic material, that is surrounded by a gripping ring or tubular member 54. The disc 50 is provided with an angular scale 8 of suitable proportions, e.g. by printing, engraving or by the scale being formed by elements that protrude from the surface of the disk 50. This embodiment is suitable for use with valves that have a rotatable adjustment member that can be rotated over a large angular range, such as for example 360°.

The gripping ring 54 is secured to the disc 50 and an outer circle referential surface of the gripping ring 54 forms a circumferential gripping face 6. A coupling member 58 is placed in the center of the disc 50. The coupling member 58 defines a slot 12 that is shaped and sized to be coupled to a rotatable adjustment member of a valve.

FIGS. 22 to 25 show another example embodiment of the detachable handle 1 and valve 2. In this example embodiment the handle 1 is essentially identical to the embodiment of FIGS. 1 to 18 with identical reference numerals referring to identical parts of the detachable handle. The detachable handle 1 according to this embodiment differs from the detachable handle of the embodiment of FIGS. 1 to 18 in that the circumferential outline of the handle is substantially semi-circular and the angular scale 8 is provided on a flat, plate like portion of the detachable handle 1. Further, the handle is provided with an upstanding edge 44. The upstanding edge 44 is placed along the straight portion of the semi-circular circumferential gripping face 6 and provides the detachable handle 1 with stability and rigidity. The operation and use of the detachable handle according to this embodiment is essentially identical to that of the handle of the embodiment of FIGS. 1 to 18.

In the shown embodiments the angular range of the handle 1 and the rotatable valve adjustment element is approximately 180°. However, it is noted that the teaching of this invention can also be applied to valves that have a much lesser range of rotation for the rotatable valve adjustment member, such as approximately 90° in ball valves and can also be used in valves that have a rotation range of up to 360°.

The term "comprising" as used in the claims does not exclude other elements or steps. The term "a" or "an" as used in the claims does not exclude a plurality

The invention claimed is:

1. A detachable handle for adjusting a valve by rotation of a rotatable adjustment element of said valve about a rotation axis, said detachable handle comprising:
 a body, said body has a front side and opposite rear side and a circumferential gripping face, said front side is provided with an angular scale;
 a coupling element that is configured to be detachably and operably connectable to said rotatable adjustment element, with the coupling element being configured such that the detachable handle can only be coupled in one angular position to said rotatable adjustment element;
 at least a portion of said body along an edge of said angular scale is transparent or open so that an operator of the handle can see through said portion of said body when said detachable handle is coupled to said rotatable adjustment member; and
 said annular scale is provided in fixed relationship to the surface of said front side for co-rotation with said surface and with an edge of said angular scale placed substantially at an adjacent edge of said transparent or open portion.

2. The detachable handle according to claim 1, wherein said coupling element comprises a slot in said body that opens to said rear side.

3. The detachable handle according to claim 2, wherein said coupling element is disposed centrally in said body.

4. The detachable handle according to claim 1, wherein said detachable handle is made from a single piece of material.

5. The detachable handle according to claim 4, wherein the detachable handle is formed in a mold filling process.

6. The detachable handle according to claim 1, wherein said angular scale is placed around one or more curved or arc shaped slots that allow a view through said body while looking at the angular scale.

7. The detachable handle according to claim 1, wherein said circumferential gripping face has an average diameter in the range between 3 cm and 10 cm.

8. The detachable handle according to claim 1, wherein an extent of said body between the front side and the rear side is substantially smaller than an average diameter of said circumferential gripping face.

9. An assembly comprising:
 a valve, said valve being provided with a rotatable adjustment element that is rotatable about a rotation axis for adjusting the valve, said valve is provided with a face from which a portion of said rotatable adjustment element protrudes, said face is provided with a fixed marker; and
 a detachable handle comprising:
  a body said body has a front side and opposite rear side and a circumferential gripping face, a surface of said front side is provided with an angular scale;
  a coupling element that is configured to detachably and operably connect said detachable handle in one predetermined angular position to said rotatable adjustment element; and
  at least a portion of said body along an edge of said angular scale is transparent or open so that an operator of said detachable handle can see said fixed marker through said portion of said body when said detachable handle is coupled to said rotatable adjustment member; and
  the angular scale is provided in fixed relationship to the surface of the front side for co-rotation with the front surface and with an edge of the angular scale placed substantially at an adjacent edge of the transparent or open portion.

10. The assembly according to claim 9, wherein said valve is a regulator valve that includes a differential pressure regulating facilities.

11. The assembly according to claim 10, wherein said regulator valve comprises an adjustable orifice, said orifice being adjustable by axially displacing a shaft that is concentric with and slidably received inside said rotatable adjustment element.

12. The assembly according to claim 11, wherein a shape and size of the rotatable adjustment member and the torque required to rotate the rotatable adjustment member are configured such that it is not possible for an operator to adjust the rotatable adjustment member without the use of a tool.

13. The assembly according to claim 11, further comprising an actuator that can be detachably connected to said regulator valve and operably connected to said shaft when said detachable handle is not attached to said rotatable adjustment element, and said actuator obscuring said rotatable adjustment member when said actuator is attached to said regulator valve.

* * * * *